US012586160B2

(12) United States Patent　　　(10) Patent No.:　US 12,586,160 B2
Chen et al.　　　　　　　　　　　(45) Date of Patent:　　Mar. 24, 2026

(54) DETECTING SYSTEM AND DETECTING METHOD FOR IMAGE SEGMENTING AND CLASSIFICATION

(71) Applicant: AUO Corporation, Hsin-Chu (TW)

(72) Inventors: Gan-Lin Chen, Hsin-Chu (TW);
Chun-Lin Chien, Hsin-Chu (TW);
Chih-Chung Chiu, Hsin-Chu (TW);
Chih-Ping Ho, Hsin-Chu (TW)

(73) Assignee: AUO CORPORATION, Hsin-Chu (TW)

( * ) Notice: Subject to any disclaimer, the term of this patent is extended or adjusted under 35 U.S.C. 154(b) by 186 days.

(21) Appl. No.: 18/540,929

(22) Filed: Dec. 15, 2023

(65) Prior Publication Data

US 2025/0104191 A1　　Mar. 27, 2025

(30) Foreign Application Priority Data

Sep. 27, 2023　(TW) ................................. 112137173

(51) Int. Cl.
　G06T 5/50　　　(2006.01)
　G06T 7/11　　　(2017.01)
　G06T 11/60　　(2006.01)
　G06V 10/25　　(2022.01)
(52) U.S. Cl.
　CPC .................. G06T 5/50 (2013.01); G06T 7/11 (2017.01); G06T 11/60 (2013.01); G06V 10/25 (2022.01); *G06T 2207/20081* (2013.01); *G06T 2207/20221* (2013.01)

(58) Field of Classification Search
CPC ... G06T 5/50; G06T 7/11; G06T 11/60; G06T 2207/20081; G06T 2207/20221; G06V 10/25; G06V 10/774; G06V 10/10; G06V 10/764; G06V 10/94
See application file for complete search history.

(56) References Cited

U.S. PATENT DOCUMENTS

2019/0130555 A1　　5/2019　Chang et al.
2019/0362130 A1 *　11/2019　Othman ................. G06V 40/13
2021/0027105 A1 *　1/2021　Cheng ................... G06T 7/0004

FOREIGN PATENT DOCUMENTS

CN　　　110473170 A　　11/2019
CN　　　114862832 A　　8/2022

* cited by examiner

*Primary Examiner* — Daniel F Hajnik
*Assistant Examiner* — Thomas John Foster
(74) *Attorney, Agent, or Firm* — WPAT, PC

(57) ABSTRACT

A detecting system includes a camera and a processor. The camera is configured to capture a first target object to generate a first image and is configured to capture a second target object different from the first target object to generate a second image. The processor is configured to detect the first image by using a first model to generate a first result and is configured to train the first model by using the first result. When the processor trains the first model by using the first result, the camera captures the second target object. After the camera captures the second target object, the processor further trains the first model by using the second image.

12 Claims, 7 Drawing Sheets

100

300

400

DETECTING SYSTEM AND DETECTING METHOD FOR IMAGE SEGMENTING AND CLASSIFICATION

CROSS-REFERENCE TO RELATED APPLICATION

This application claims priority to Taiwan Application Serial Number 112137173, filed Sep. 27, 2023, which is herein incorporated by reference in its entirety.

BACKGROUND

Technical Field

The present disclosure relates to a detecting system. More particularly, the present disclosure relates to a detecting system and a detecting method.

Description of Related Art

In order to increase detection efficiency, machines in factories are equipped with automated optical inspection (AOI) devices. In order to improve detection quality, the machines are further equipped with artificial intelligence (AI) technology. However, data collection, data marking, and management and maintenance of AI models, which are necessary for training the AI models, are all time-consuming, labor-intensive, and expensive. Thus, techniques associated with the development for overcoming the problems described above are important issues in the field.

SUMMARY

The present disclosure provides a detecting system. The detecting system includes a camera and a processor. The camera is configured to capture a first target object to generate a first image and capture a second target object different from the first target object to generate a second image. The processor is configured to detect the first image by using a first model to generate a first result, and train the first model by using the first result. When the processor trains the first model by using the first result, the camera captures the second target object. The processor trains the first model by using the second image after the camera captures the second target object.

The present disclosure also provides a detecting method. The detecting method includes: capturing a first target object to generate a first image; detecting the first image; training a first model by using the first image; capturing a second target object different from the first target object to generate a second image when training the first model by using the first image; and training the first model by using the second image after training the first model by using the first image.

The present disclosure also provides a method. The method includes: generating a first image according to a first target object; training a first model according to the first image and generating a second image according to a second target object different from the first target object simultaneously; and training the first model according to the second image after training the first model according to the first image.

It is to be understood that both the foregoing general description and the following detailed description are by examples, and are intended to provide further explanation of the disclosure as claimed.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
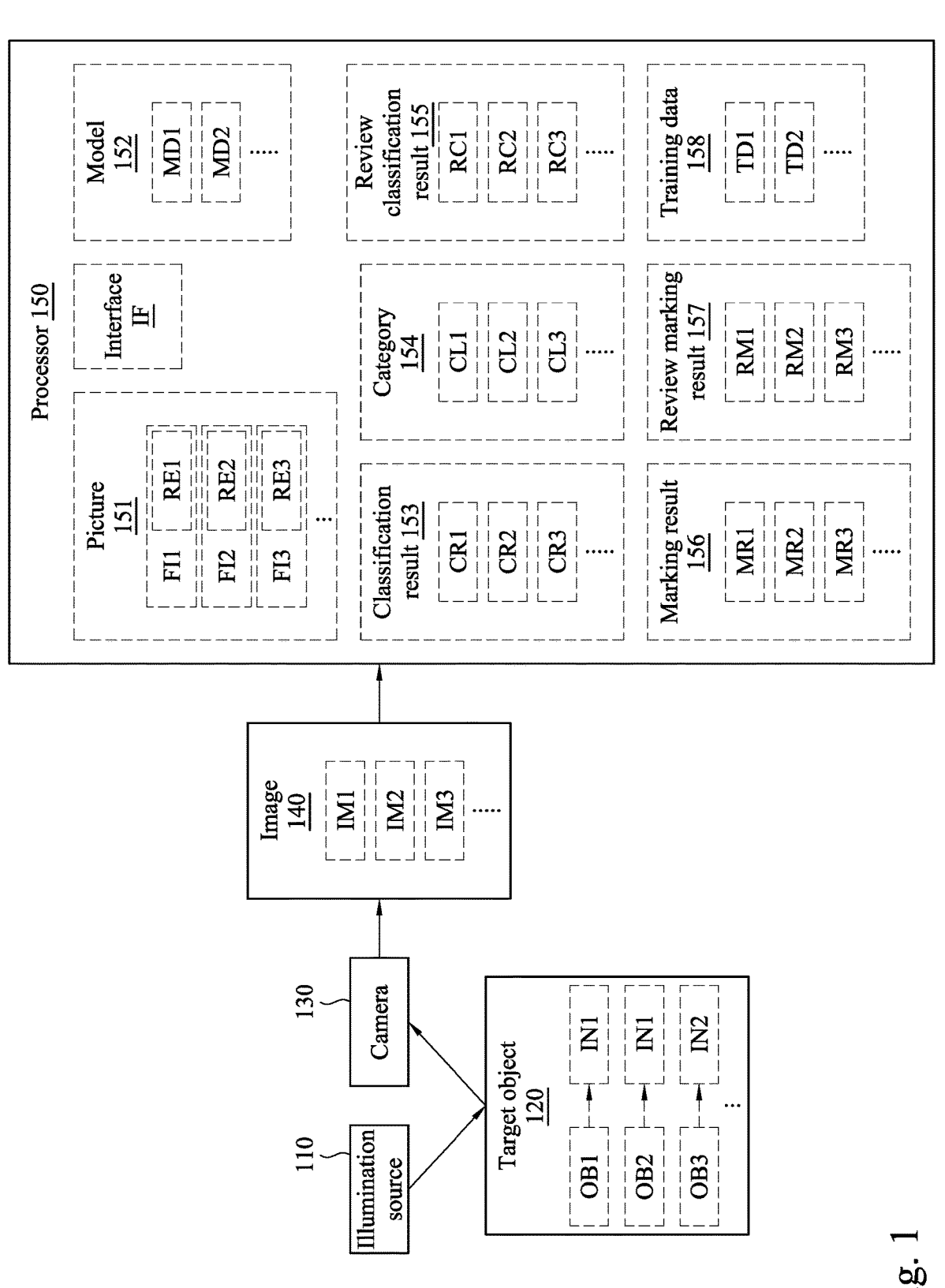
FIG. 1 depicts a schematic diagram of a detecting system according to some embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper", "left," "right" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

The terms applied throughout the following descriptions and claims generally have their ordinary meanings clearly established in the art or in the specific context where each term is used. Those of ordinary skill in the art will appreciate that a component or process may be referred to by different names. Numerous different embodiments detailed in this specification are illustrative only, and in no way limits the scope and spirit of the disclosure or of any exemplified term.

It is worth noting that the terms such as "first" and "second" used herein to describe various elements or processes aim to distinguish one element or process from another. However, the elements, processes and the sequences thereof should not be limited by these terms. For example, a first element could be termed as a second element, and a second element could be similarly termed as a first element without departing from the scope of the present disclosure.

In the following discussion and in the claims, the terms "comprising," "including," "containing," "having," "involving," and the like are to be understood to be open-ended, that is, to be construed as including but not limited to. As used herein, instead of being mutually exclusive, the term "and/or" includes any of the associated listed items and all combinations of one or more of the associated listed items.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

Reference will now be made in detail to the present embodiments of the disclosure, examples of which are illustrated in the accompanying drawings. Wherever possible, the same reference numbers are used in the drawings and the description to refer to the same or like parts.

FIG. 1 depicts a schematic diagram of a detecting system 100 according to some embodiments of the present disclosure. As shown in FIG. 1, the detecting system 100 includes an illumination source 110, a target object 120, a camera 130, an image 140, and a processor 150.

In some embodiments, the illumination source 110 is configured to illuminate the target object 120. The camera 130 is configured to capture the target object 120 and transmit the image 140 obtained by capturing the target object 120 to the processor 150 for processing. In some embodiments, the target object 120 is a product placed on the machine.

As shown in FIG. 1, the target object 120 includes target objects OB1~OB3 and information IN1~IN2. The image 140 includes images IM1~IM3. The processor 150 includes a picture 151, a model 152, a classification result 153, a category 154, a review classification result 155, a marking result 156, a review marking result 157, training data 158, and an interface IF. In some embodiments, the target objects OB1 and OB2 correspond to the information IN1, and the target object OB3 corresponds to the information IN2. In some embodiments, the processor 150 further includes an automated optical inspection (AOI) device with an artificial intelligence (AI) technology and a graphics processing unit (GPU) device (not shown in the figure).

As shown in FIG. 1, the picture 151 includes pictures FI1-FI3. The pictures FI1-FI3 respectively include regions RE1-RE3. The model 152 includes models MD1-MD2. The classification result 153 includes classification results CR1-CR3. The category 154 includes categories CL1-CL3. The review classification result 155 includes review classification results RC1-RC3. The marking result 156 includes marking results MR1-MR3. The review marking result 157 includes review marking results RM1-RM3. The training data 158 includes training data TD1-TD2.

Figure 5B:
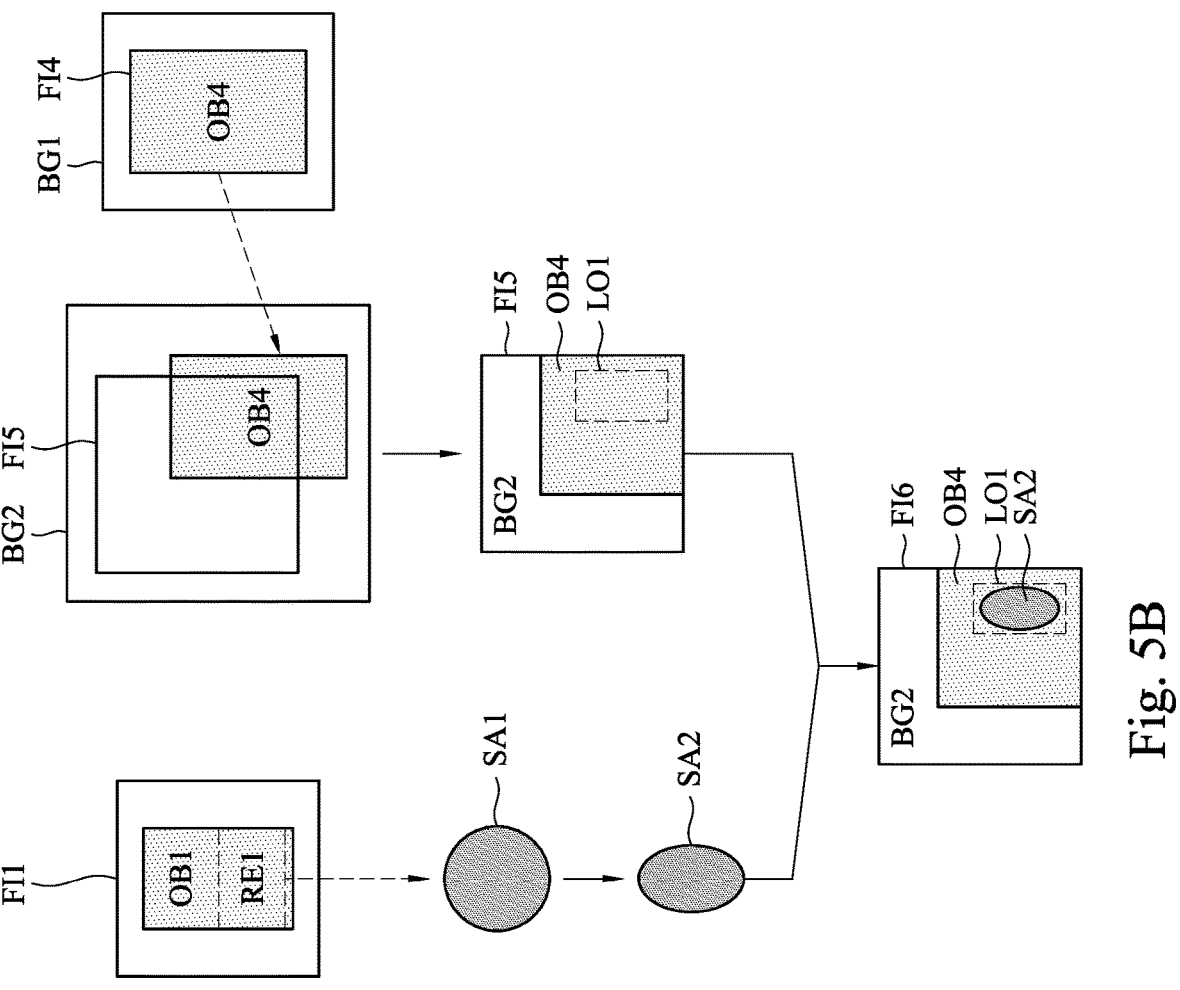
FIG. 5B depicts a schematic diagram corresponding to the operation shown in FIG. 5A according to some embodiments of the present disclosure.
Figure 6B:
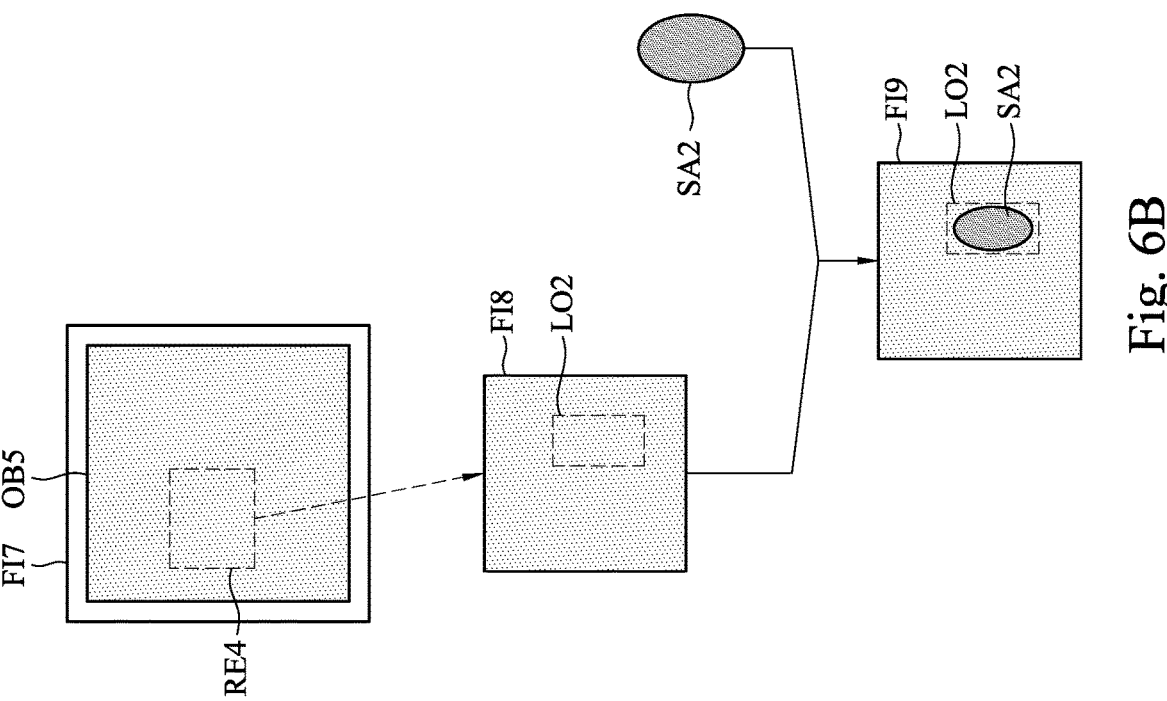
FIG. 6B depicts a schematic diagram corresponding to the operation shown in FIG. 6A according to some embodiments of the present disclosure.

In some embodiments, the target object 120 also includes a target object OB4 in FIG. 5B and a target object OB5 in FIG. 6B. The picture 151 also includes pictures FI4-FI6 in FIG. 5B, pictures FI7-FI9 in FIG. 6B, a picture FI10, and a picture FI11 in FIG. 7B.

In some embodiments, the information IN1 and IN2 are product numbers or product information of other types. The categories CL1-CL3 correspond to different abnormal types of the target object 120. The regions RE1-RE3 include position parameters, such as multiple sets of position parameters constituted by X coordinates and Y coordinates. In some embodiments, the abnormal types include large bubble abnormality, multiple bubble abnormality, bubble particle abnormality, small bubble abnormality, polarizer dirt abnormality, and polarizer damage abnormality. For example, the category CL1 corresponds to one of the above abnormal types, and the category CL2 corresponds to another of the above abnormal types.

Figure 2:
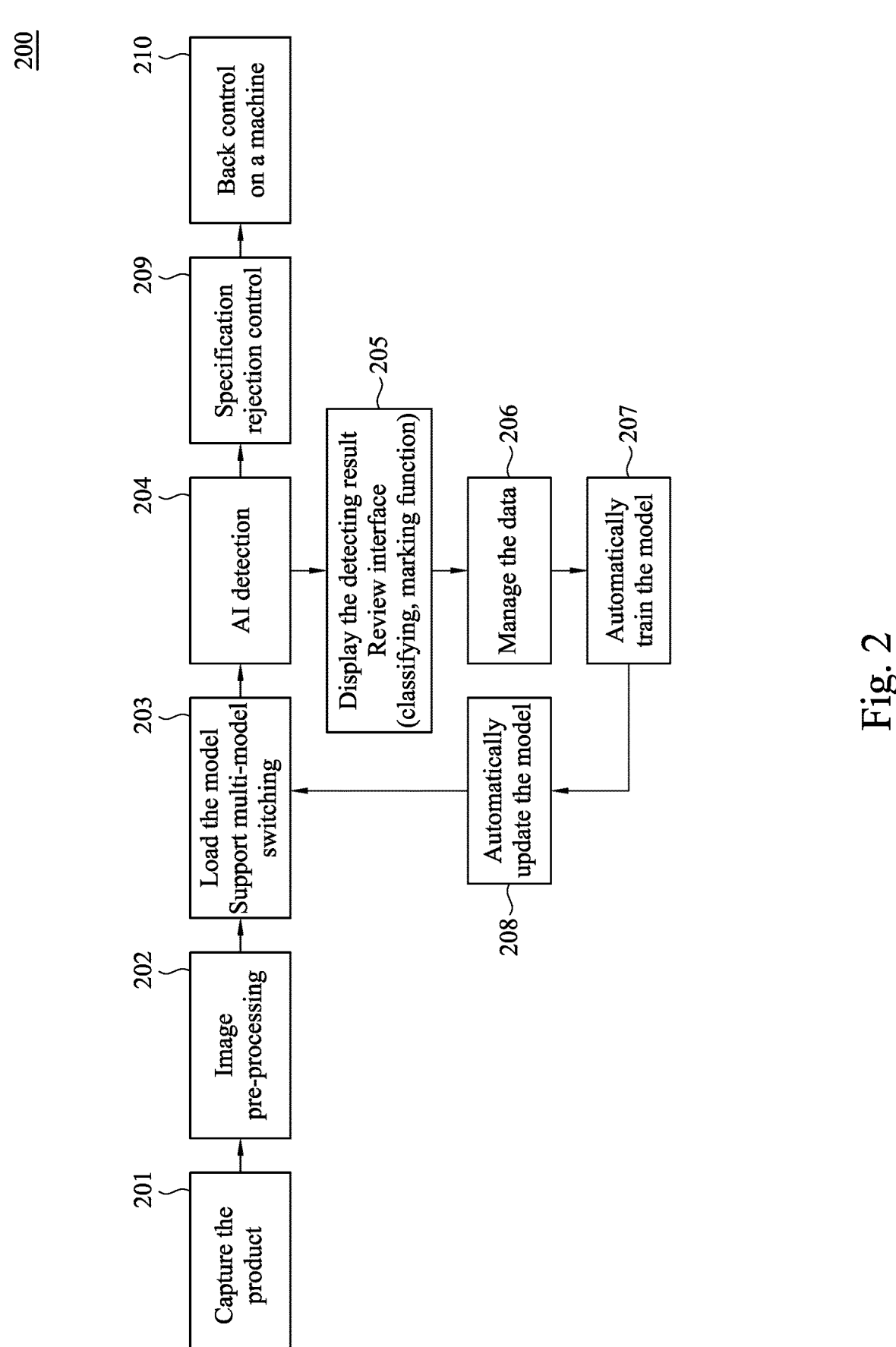
FIG. 2, FIG. 3 and FIG. 4 depict flowcharts of detecting methods according to some embodiments of the present disclosure.

FIG. 2 depicts a flowchart of a detecting method 200 according to some embodiments of the present disclosure. In some embodiments, the detecting method 200 is applied to the detecting system 100 shown in FIG. 1, but the embodiment of the present disclosure is not limited thereto. In different embodiments, the detecting method 200 can be applied to some other detecting systems. For the purpose of illustration, relevant operations of the detecting method 200 will be described below by taking components of the detecting system 100 for example.

A description is provided with reference to FIG. 2. The detecting method 200 includes operations 201-210. In different embodiments, the detecting method according to the embodiment of the present disclosure includes one part or a combination of operations 201-210.

In operation 201, the illumination source 110 illuminates the target object 120, and the camera 130 captures the target object 120 to obtain the image 140.

In operation 202, the camera 130 transmits the image to the graphics processing Unit (GPU) device in the processor 150. By using the GPU device to perform image preprocessing on the image 140, the picture 151 is generated.

In operation 203, the processor 150 loads the model 152 according to the picture 151. In some embodiments, the processor 150 supports a multi-model switching function.

In operation 204, the processor 150 employs the artificial intelligence (AI) technology to detect the picture 151 according to the model 152 so as to generate a detecting result. In some embodiments, the detecting result includes the classification result 153 and the marking result 156. In some embodiments, the processor 150 performs classification and marking operations on the picture 151 by using the model 152 to generate the classification result 153 and the marking result 156.

In operation 205, the processor 150 displays the detecting result on the interface IF (such as a user interface) and reviews the detecting result so as to generate a review result. In some embodiments, the review result includes the review classification result 155 and the review marking result 157.

In operation 206, the processor 150 manages the training data 158 according to the review result.

In operation 207, the processor 150 automatically trains the model 152 according to the training data 158.

In operation 208, the processor 150 automatically updates the model 152, and then performs operation 203 again.

In operation 209, the processor 150 detects whether the target object 120 passes a specification rejection control or not.

In operation 210, the processor 150 performs a back control on a machine according to operation 209.

Figure 3:
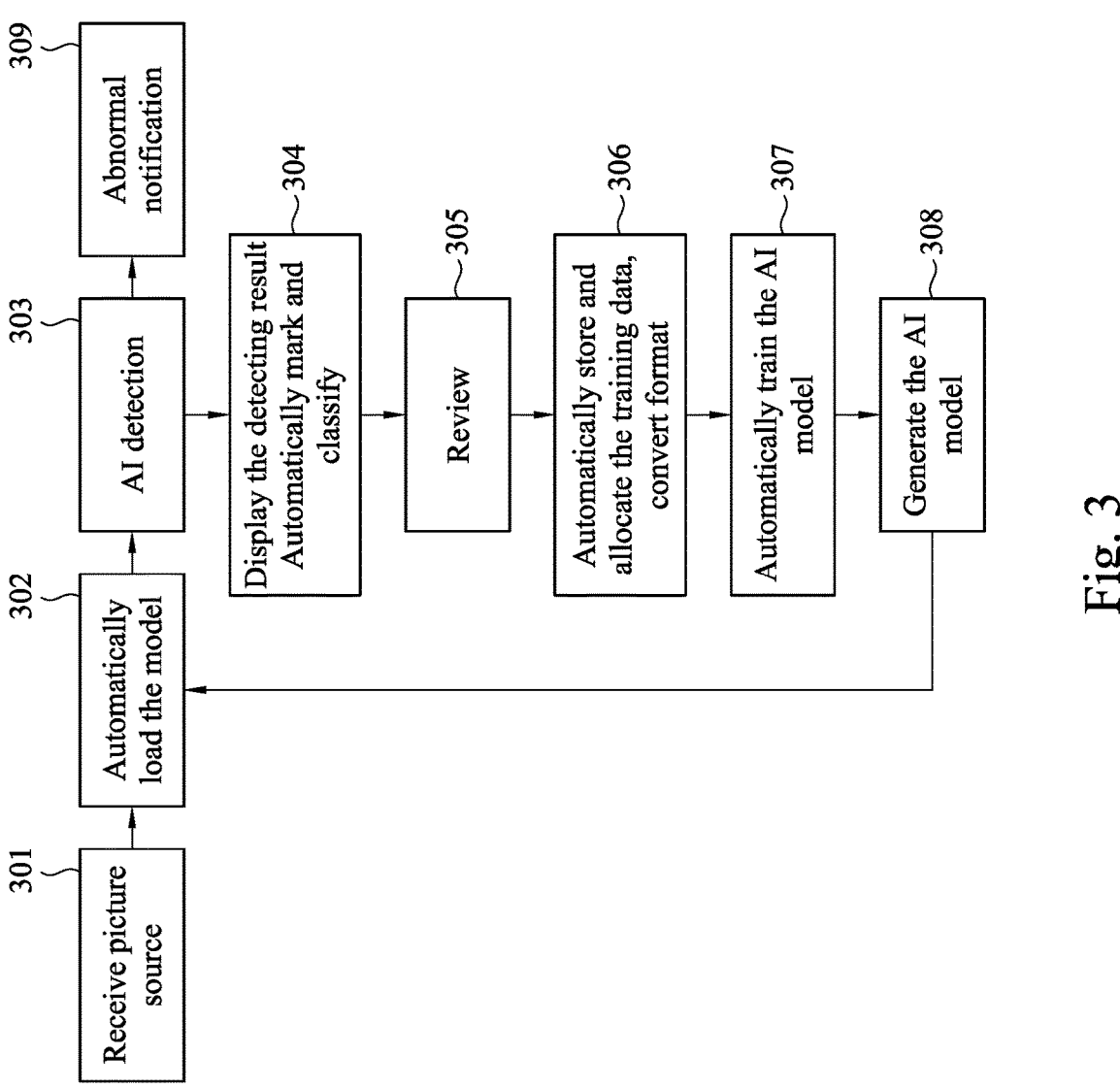

FIG. 3 depicts a flowchart of a detecting method 300 according to some embodiments of the present disclosure. In some embodiments, the detecting method 300 is applied to the detecting system 100 shown in FIG. 1, but the embodiment of the present disclosure is not limited thereto. In different embodiments, the detecting method 300 can be applied to some other detecting systems. For the purpose of illustration, relevant operations of the detecting method 300 will be described below by taking components of the detecting system 100 for example.

A description is provided with reference to FIG. 3. The detecting method 300 includes operations 301-309. In different embodiments, the detecting method according to the embodiment of the present disclosure includes one part or a combination of operations 301-309.

In operation 301, the camera 130 captures the target object OB1 to generate the image IM1, and captures the target object OB2 different from the target object OB1 after generating the image IM1 to generate the image IM2. After the images IM1 and IM2 are generated, the camera 130 sequentially transmits the images IM1 and IM2 to the GPU device in the processor 150. Then, the processor 150 performs image pre-processing on the images IM1 and IM2 sequentially by using the GPU device to respectively generate the pictures FI1 and FI2.

In operation 302, the processor 150 automatically loads the model 152, such as the model MD1, sequentially according to the pictures FI1 and FI2.

In operation 303, the processor 150 sequentially detects the pictures FI1 and FI2 by using the model MD1 to respectively generate the classification results CR1 and CR2. In some embodiments, the operation of sequentially detecting the pictures FI1 and FI2 includes classifying the picture FI1 into the category CL1 and classifying the picture FI2 into the category CL2, sequentially, by using the model MD1. In some embodiments, the classification results CR1 and CR2 respectively include classifications of the pictures FI1 and FI2 by using the model MD1, such as the categories CL1 and CL2.

In operation 304, the processor 150 sequentially displays the classification results CR1 and CR2 on the interface IF.

In operation 305, the processor 150 sequentially reviews the classification results CR1 and CR2 to respectively generate the review classification results RC1 and RC2. For example, under the circumstance that the picture FI1 is classified into the category CL1, the processor 150 reviews whether the picture FI1 belongs to the category CL1 or not according to a judging standard different from the model MD1 (such as a judging standard of a person or a model different from the model MD1) to generate the review classification result RC1. When the review classification result RC1 indicates that the picture FI1 belongs to the category CL1, the classification result CR1 is the same as the review classification result RC1. When the review classification result RC1 indicates that the picture FI1 does not belong to the category CL1, the classification result CR1 is different from the review classification result RC1. In some embodiments, the operations similar to those performed on the classification result CR1 and the review classification result RC1 can be performed on the classification result CR2 and the review classification result RC2.

In operation 306, the processor 150 automatically stores and allocates the training data 158, such as the training data TD1, according to the classification result CR1 and the review classification result RC1, and converts the training data TD1 into a same format. After that, the processor 150 automatically stores and allocates the training data TD1 according to the classification result CR2 and the review classification result RC2, and converts the training data TD1 into the same format.

In operation 307, the processor 150 automatically trains the model MD1 according to the training data TD1. For example, parameters of the model MD1 are adjusted when the classification result CR1 is different from the review classification result RC1, and the parameters of the model MD1 are kept unchanged when the classification result CR1 is the same as the review classification result RC1. In some embodiments, the operations similar to those performed on the classification result CR1 and the review classification result RC1 can be performed on the classification result CR2 and the review classification result RC2.

In operation 308, the processor 150 generates the trained model MD1, and then performs operation 302 again to detect another picture, such as the picture FI3.

In operation 309, the processor 150 sends an abnormal notification according to the classification result 153. For example, when the classification result CR1 indicates that the picture FI1 is classified into the category CL1, the processor 150 sends the abnormal notification. In some embodiments, sending the abnormal notification includes sending an alerting letter, making an alert sound or displaying the abnormal notification content on the interface IF. In some embodiments, the abnormal notification content includes a picture and a category, such as the picture FI1 and the category CL1.

In some embodiments, operation 303 also includes that the processor 150 sequentially detects the pictures FI1 and FI2 by using the model MD1 to respectively generate the marking results MR1 and MR2. In some embodiments, the operation of sequentially detecting the pictures FI1 and FI2 also includes indicating the region RE1 in the picture FI1 and indicating the region RE2 in the picture FI2, sequentially, by using the model MD1. In some embodiments, the regions RE1 and RE2 include multiple sets of position parameters of the abnormal types. For example, when the picture FI1 has the large bubble abnormality, the processor 150 frames the large bubble abnormality by using the region RE1. In other words, the large bubble abnormality is located within the region RE1. In some embodiments, the marking results MR1 and MR2 respectively include markings of the pictures FI1 and FI2 by the processor 150, such as the regions RE1 and RE2.

In some embodiments, operation 304 also includes that the processor 150 sequentially displays the marking results MR1 and MR2 on the interface IF.

In some embodiments, operation 305 also includes that the processor 150 sequentially reviews the marking results MR1 and MR2 to respectively generate the review marking results RM1 and RM2. For example, under the circumstance that the picture FI1 has the large bubble abnormality and it is marked within the region RE1, the processor 150 reviews whether the position parameter of the region RE1 needs to be adjusted or not according to a judging standard different from the model MD1 (such as a judging standard of a person or a model different from the model MD1) to generate the review marking result RM1. When the position parameter of the region RE1 is judged to need an adjustment, the processor 150 adjusts the position parameter of the region RE1 according to a position where the picture FI1 has the large bubble abnormality, so that the marking result MR1 is different from the review marking result RM1. When the region RE1 is judged not to need an adjustment, the marking result MR1 is the same as the review marking result RM1. In some embodiments, the operations similar to those performed on the marking result MR1 and the review marking result RM1 can be performed on the marking result MR2 and the review marking result RM2.

In some embodiments, operations 301~308 may be performed simultaneously. For example, when the processor 150 performs operation 307 to train the model MD1 by using the training data TD1 including the review classification result RC1 and the review marking result RM1, the camera 130 performs operation 301 to capture the target object OB2 so as to generate the image IM2. After the camera 130 captures the target object OB2, the processor 150 further trains the model MD1 by using the image IM2. For example, the processor 150 performs operation 307 again to train the model MD1 by using the review classification result RC2 and the review marking result RM2.

For another example, when the processor 150 performs operation 307 to train the model MD1 by using the picture FI1, the processor 150 performs operation 303 to detect the picture FI2 by using the model MD1 and the camera 130 performs operation 301 to capture the target object OB3 and generate the image IM3. After the camera 130 captures the target object OB3, the processor 150 performs operation 307 again to train the model 152 by using the image IM3 and the picture FI2.

A description is provided with reference to FIG. 1 to FIG. 3. In some embodiments, operation 301 corresponds to operations 201-202. Operation 302 corresponds to operation 203. Operation 303 corresponds to operation 204. Operations 304 and 305 correspond to operation 205. Operation 306 corresponds to operation 206. Operation 307 corresponds to operation 207. Operation 308 corresponds to operation 208. Operation 309 corresponds to operations 209-210.

In some practices, factory machines are equipped with AOI devices for quality detection. In order to maintain detection quality, different parameters need to be manually adjusted correspondingly depending on different products. In order to improve the quality of detection, an AI technology is further introduced into quality detection. However, the introduction of AI technology requires the modification of AOI device or the replacement of detecting equipment, which is expensive. In addition, the introduction of AI technology requires maintaining the accuracy of the model, retraining the model, and updating the model manually, and operating personnel need to be familiar with the AI technology before they can operate. There are many pieces of equipment, which in turn is very time-consuming and difficult to maintain. Additionally, the quality detection needs to be interrupted during the period that the AOI device retrains the model and manually updates the model or detecting parameters, thus resulting in poor detection efficiency.

As compared with the above practices, in some embodiments of the present disclosure, the processor 150 can still detect the image FI2 while training and updating the model MD1 according to the image FI1, so that the training and detection are not interrupted. In addition to that, the detecting system 100 relies less on the operating personnel, thus improving detection efficiency. In addition, the detection difficulty and detection time can be further reduced by using the model MD1 to mark the abnormal region with the marking result MR1.

Figure 4:
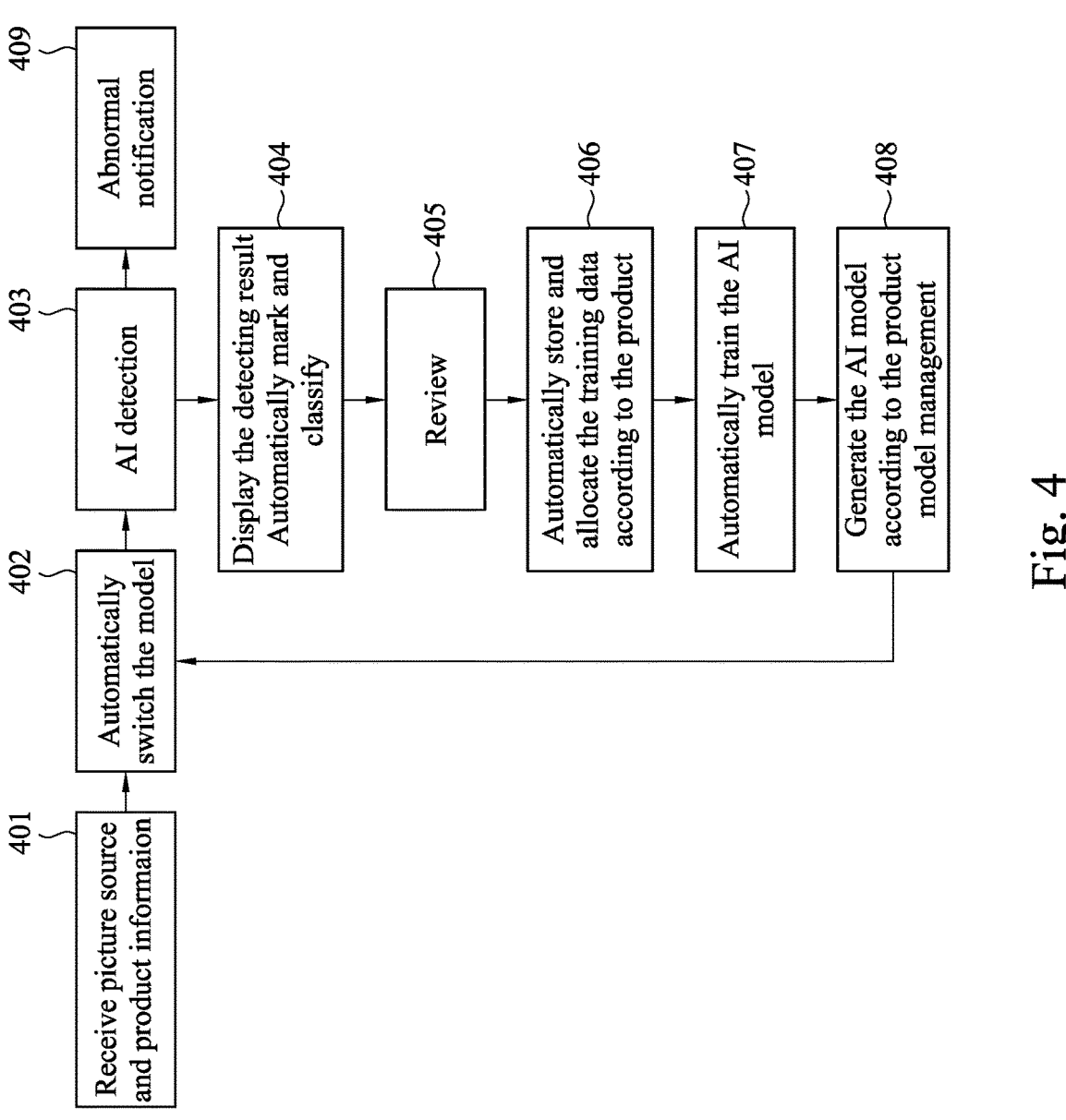

FIG. 4 depicts a flowchart of a detecting method 400 according to some embodiments of the present disclosure. In some embodiments, the detecting method 400 is applied to the detecting system 100 shown in FIG. 1, but the embodiment of the present disclosure is not limited thereto. In different embodiments, the detecting method 400 can be applied to some other detecting systems. For the purpose of illustration, relevant operations of the detecting method 400 will be described below by taking components of the detecting system 100 for example.

A description is provided with reference to FIG. 4. The detecting method 400 includes operations 401-409. In different embodiments, the detecting method according to the embodiment of the present disclosure includes one part or a combination of operations 401-409. A description is provided with reference to FIG. 3 and FIG. 4. In some embodiments, operations 401-409 respectively correspond to operations 301-309, so some descriptions are not repeated.

In operation 401, the camera 130 further captures the target object OB3 to generate the image IM3, then the camera 130 transmits the image IM1 and the information IN1 corresponding to the target object OB1 to the GPU device. After that, the camera 130 transmits the image IM3 and the information IN2 corresponding to the target object OB3 to the GPU device. The processor 150 thereafter performs image pre-processing on the images IM3 by using the GPU device to generate the pictures FI3. In some embodiments, the target objects OB1 and OB2 have the information, and the target object OB3 that is different from the target object OB1 has the information IN2 different from the information IN1.

In operation 402, the processor 150 sequentially selects the model MD1 from the model 152 correspondingly according to the information IN1 of the picture FI1 to load, and selects the model MD2 from the model 152 correspondingly according to the information IN2 of the picture FI3 to load. In some embodiments, the model MD1 is different from the model MD2.

In operation 403, the processor 150 sequentially detects the picture FI1 by using the model MD1 to generate the classification result CR1 and detects the picture FI3 by using the model MD2 to generate the classification result CR3. In some embodiments, the operation of detecting the picture FI1 includes classifying the picture FI1 into the category CL1 by using the model MD1, and the operation of detecting the picture FI3 includes classifying the picture FI3 into the category CL3 by using the model MD2. In some embodiments, the classification result CR1 includes classification of the picture FI1 by using the model MD1, such as the category CL1, and the classification result CR3 includes classification of the picture FI3 by using the model MD2, such as the category CL3.

In operation 404, the processor 150 sequentially displays the classification result CR1 and the corresponding information IN1 on the interface IF and displays the classification result CR3 and the corresponding information IN2 on the interface IF.

In operation 405, the processor 150 sequentially reviews the classification results CR1 and CR3 to respectively generate the review classification results RC1 and RC3. For example, under the circumstance that the picture FI1 is classified into the category CL1 and the picture FI3 is classified into the category CL3, the processor 150 sequentially reviews whether the picture FI1 belongs to the category CL1 or not according to a judging standard different from the model MD1 (such as a judging standard of a person or a model different from the model MD1) to generate the review classification result RC1 and reviews whether the picture FI3 belongs to the category CL3 or not according to a judging standard different from the model MD2 (such as a judging standard of a person or a model different from the model MD2) to generate the review classification result RC3.

In operation 406, the processor 150 automatically stores and allocates the training data TD1 according to the information IN1, the classification result CR1, and the review classification result RC1, and converts the training data TD1 into a same format, and automatically stores and allocates the training data TD2 according to the information IN2, the classification result CR3, and the review classification result RC3, and converts the training data TD2 into the same format, sequentially.

In operation 407, the processor 150 automatically trains the model MD1 according to the training data TD1, and then automatically trains the model MD2 according to the training data TD2. For example, parameters of the model MD1 are adjusted when the classification result CR1 is different from the review classification result RC1, and the parameters of the model MD1 are kept unchanged when the classification result CR1 is the same as the review classification result RC1. In some embodiments, the operations similar to those performed on the classification result CR1 and the review classification result RC1 can be performed on the classification result CR3 and the review classification result RC3.

In operation 408, the processor 150 sequentially generates the trained models MD1 and MD2, and then performs operation 402 again to selects another model according to another information and detect another picture.

In some embodiments, since operation 409 is similar to operation 309, a description in this regard is not repeated. As compared with operation 309, the abnormal notification content of operation 409 further includes information, such as the information IN1.

In some embodiments, operation 403 also includes that the processor 150 sequentially detects the picture FI1 by using the model MD1 to generate the marking result MR1 and detects the picture FI3 by using the model MD2 to generate the marking result MR2. In some embodiments, the operation of detecting the picture FI1 also includes indicating the region RE1 in the picture FI1 by using the model MD1, and the operation of detecting the picture FI3 also includes indicating the region RE3 in the picture FI3 by using the model MD2.

In some embodiments, operation 404 also includes that the processor 150 sequentially displays the marking result MR1 and the corresponding information IN1 and the marking result MR3 and the corresponding information IN2 on the interface IF.

In some embodiments, operation 405 also includes that the processor 150 sequentially reviews the marking results MR1 and MR3 to respectively generate the review marking results RM1 and RM3. For example, under the circumstance that the picture FI1 has the marked region RE1, the processor 150 reviews whether the position parameter of the region RE1 needs to be adjusted or not according to a judging standard different from the model MD1 (such as a judging standard of a person or a model different from the model MD1) to generate the review marking result RM1. In some embodiment, the operations similar to those performed on the marking result MR1 and the review marking result RM1 can be performed on the marking result MR3 and the review marking result RM3.

In some embodiments, operations 401-408 may be performed simultaneously. For example, when the processor 150 performs operation 407 to train the model MD1 by using the training data TD1 including the review classification result RC1 and the review marking result RM1, the camera 130 performs operation 401 to capture the target object OB3 so as to generate the image IM3. After the camera 130 captures the target object OB3, the processor 150 further trains the model MD2 by using the image IM3. For example, the processor 150 performs operation 407 again to train the model MD2 by using the review classification result RC3 and the review marking result RM3.

For another example, when the processor 150 performs operation 407 to train the model MD1 by using the picture FI1, the processor 150 performs operation 403 to detect the picture FI3 by using the model MD2 and the camera 130 performs operation 401 to capture the target object OB2 so as to generate the image IM2. After the camera 130 captures the target object OB2, the processor 150 performs operation 407 again to train the models MD2 and MD1 by using the picture FI3 IM3 and the image IM2, respectively.

In some practices, factory machines perform quality detections on different products. The introduced AI technology cannot automatically switch and train the AI models correspondingly according to the different products. Therefore, when the machine is online, the operating personnel need to manually set the corresponding AI models according to the different products. There are many pieces of equipment, which in turn is very time-consuming. As a result, the detection efficiency is poor.

As compared with the above practices, in some embodiments of the present disclosure, the processor 150 automatically selects the models MD1 and MD2 according to the information IN1 and IN2, respectively. As a result, the detecting system 100 relies less on the operating personnel, thus improving detection efficiency.

Figure 5A:
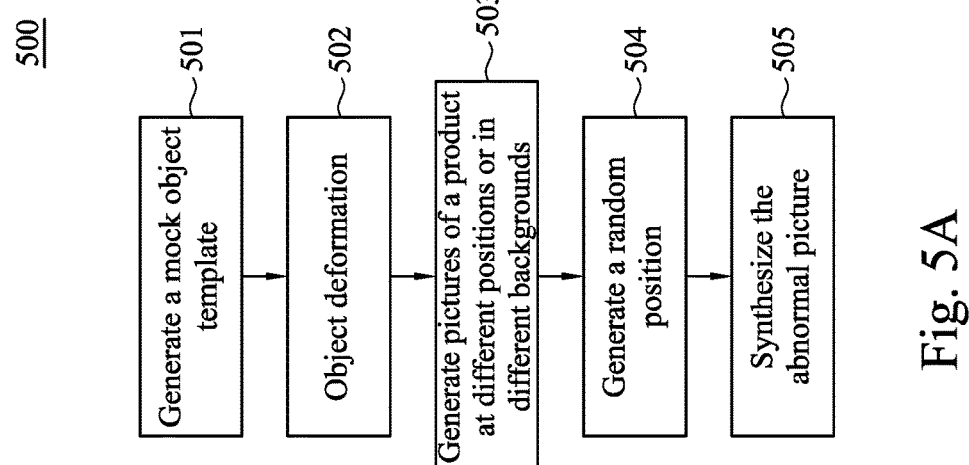
FIG. 5A, FIG. 6A, and FIG. 7A depict flowcharts of operations according to some embodiments of the present disclosure.

FIG. 5A depicts a flowchart of an operation 500 according to some embodiments of the present disclosure. In some embodiments, the operation 500 is applied to the detecting system 100 shown in FIG. 1, but the embodiment of the present disclosure is not limited thereto. In different embodiments, the operation 500 can be applied to some other detecting systems. For the purpose of illustration, relevant operations of the operation 500 will be described below by taking components of the detecting system 100 for example.

FIG. 5B depicts a schematic diagram corresponding to the operation 500 shown in FIG. 5A according to some embodiments of the present disclosure. A description is provided with reference to FIG. 5A and FIG. 5B. In some embodiments, the operation 500 can generate the picture FI6 based on the pictures FI1 and FI4, but the embodiment of the present disclosure is not limited thereto. In different embodiments, the operation 500 may perform processing based on other pictures to generate other abnormal pictures.

As shown in FIG. 5A, the operation 500 includes operations 501-505. In different embodiments, the operation according to the embodiment of the present disclosure includes one part or a combination of operations 501-505. In some embodiments, the operation 500 corresponds to operation 301 in FIG. 3.

In operation 501, the processor 150 generates a mock object template according to a feature of a specific abnormal type. For example, the processor 150 extracts a template SA1 from the region RE1 in the target object OB1 in the picture FI1. In some embodiments, extracting the template SA1 is, for example, creating a feature of an edge-gradient halo abnormality. In some embodiments, the template SA1 is a feature of an abnormal type, for example, the feature of large bubble abnormality.

In operation 502, the processor 150 performs object deformation on the template SA1 to generate a template SA2. In some embodiments, the object deformation includes enlarging, shrinking, twisting, horizontally extending, or vertically extending.

In operation 503, the processor 150 generates pictures of a product at different positions or in different backgrounds. For example, the processor 150 extracts the target object OB4 from the picture FI4 having a background BG1 and the target object OB4, shrinks or enlarges the target object OB4 or maintains a size of the target object OB4 unchanged, and places the target object OB4 at any position in a background BG2 different from the background BG1 to generate the picture FI5. In some embodiments, the picture FI1 includes part or all of target object OB4.

In operation 504, the processor 150 indicates a location LO1 at any position in an area where the picture FI5 has the target object OB4.

In operation 505, the processor 505 merges the template SA2 and the picture FI5 according to the location LO1 to generate the picture FI6. For example, the processor 150 places the template SA2 in the location LO1 of picture FI5 to generate the picture FI6. In some embodiments, the processor 150 performs operation 302 after operation 505 to train the model 152, such as the model MD1 or MD2, by using the picture FI6.

In some practices, when a new product is introduced into the machine of a factory for quality detection, there is less training data used for training the model corresponding to the new product. In order to increase the training data of the product having abnormal features, traditional image data augmentation methods such as rotation, shifting, flipping, scaling, stretching, italics, and elastic distortion, etc., are used. However, these methods cannot replace the background in the image, and the object in the image will also deform with the image, thus resulting in poor detection effect. Additionally, the generative adversarial network (GAN) data augmentation method is also used to increase the training data of abnormal features of product. However, it requires a large number of product images for training and requires more pieces of equipment, so the augmentation method is more difficult. In addition to that, it cannot be designated to generate specific types of product abnormal features into a specified size or position, thus causing the training data of the abnormal features of some of the products that is augmented to be inconsistent with the actual abnormal states of the specified products. As a result, the equipment cost is increased, more storage space is used, and the detection quality is poor.

As compared with the above practices, in some embodiments of the present disclosure, the processor 150 generates the template SA2 based on the template SA1 of the picture FI1, and merges the template SA2 and the picture FI5 into the picture FI6. Therefore, under the circumstance that there is less training data 158 (such as the training data TD2) for the product, the processor 150 can automatically add the pictures FI5 of the product in different backgrounds and the pictures FI6 of the product with a specific abnormal type as the training data TD2, and the target object OB4 in the pictures FI6 will not deform and is consistent with the specified actual state. As a result, the storage space is saved, less equipment is required, and the detection quality can be improved in a shorter period of time.

Figure 6A:
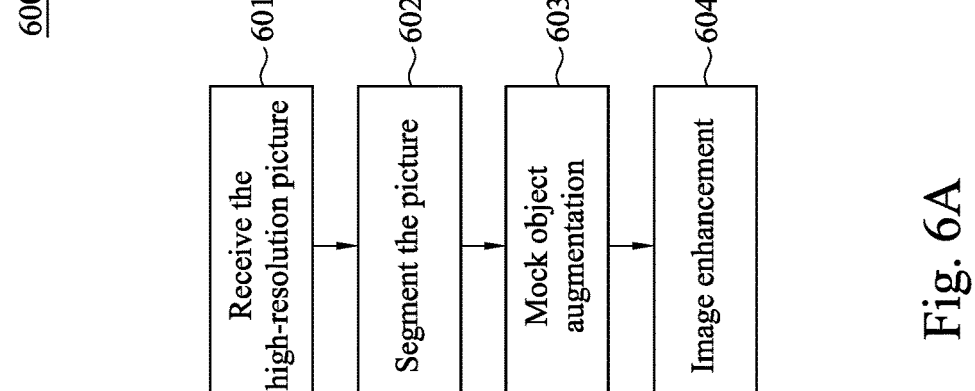

FIG. 6A depicts a flowchart of an operation 600 according to some embodiments of the present disclosure. In some embodiments, the operation 600 is applied to the detecting system 100 shown in FIG. 1, but the embodiment of the present disclosure is not limited thereto. In different embodiments, the operation 600 can be applied to some other detecting systems. For the purpose of illustration, relevant operations of the operation 600 will be described below by taking components of the detecting system 100 for example.

FIG. 6B depicts a schematic diagram corresponding to the operation 600 shown in FIG. 6A according to some embodiments of the present disclosure. A description is provided with reference to FIG. 6A and FIG. 6B. In some embodiments, the operation 600 can generate the picture FI9 based on the picture FI7 and the template SA2, but the embodiment of the present disclosure is not limited thereto. In different embodiments, the operation 600 may perform processing based on other pictures to generate other abnormal pictures.

As shown in FIG. 6A, the operation 600 includes operations 601-604. In different embodiments, the operation according to the embodiment of the present disclosure includes one part or a combination of operations 601-604. In some embodiments, the operation 600 corresponds to operation 301 in FIG. 3.

In operation 601, the processor 150 receives the picture 151. In some embodiments, the picture 151 includes a high-resolution picture, such as a picture with hundreds of millions of pixels. In some embodiments, the picture 151 includes a picture with a typical resolution. For example, the camera 130 captures the target object OB5 different from the target object OB1 and using the GPU device of the processor 150 to perform image pre-processing to generate the picture FI7.

In operation 602, the processor 150 automatically detects a region of interest (ROI) and segments the picture FI7 according to the ROI. In some embodiments, the ROI is the region where the target object 120 tends to have an abnormality, such as the regions RE1-RE3 respectively corresponding to the target objects OB1-OB3. For example, in FIG. 6B the processor 150 automatically detects that the region RE4 in the target object OB5 in the picture FI7 is the ROI, segments the picture FI7 according to the region RE4 to generate multiple pictures, and selects the picture FI8 including the region RE4 to perform processing.

In operation 603, the processor 150 automatically generates the picture FI9 having an abnormal feature (such as the template SA2), and equalizes a distribution position of the abnormal feature of the picture FI9. In some embodiments, the processor 150 performs operations similar to the operation 500 in FIG. 5A. For example, the processor 150 performs operation 501 to generate the template SA1 according to the region RE1 in the object OB1 in the picture FI1. The processor 150 then performs operation 502 to perform object deformation on the template SA1 and generate the template SA2. After that, the processor 150 performs operation 504 to generate a random location LO2 in picture FI8. Next, the processor 150 performs operation 505 to place the template SA2 in the location LO2 and generate the picture FI9. Then, the processor 150 equalizes the template SA2 in the picture FI9 and an area surrounding the template SA2 (such as an area of the location LO2) to increase the contrast of the template SA2 in the picture FI9.

In operation 604, the processor 150 performs image enhancement on the picture FI9 by using a deblurring algorithm to generate the picture FI10 (not shown in the figure), so as to enhance the image sharpness of the picture FI9. After operation 604, the processor 150 performs operation 302 to train the model 152, such as the model MD1 or MD2, by using the picture FI10.

In some practices, the camera captures larger products (such as a 250 cm×220 cm glass substrate) to obtain high-resolution pictures (such as hundreds of millions of pixels). Because the picture files are too large and there are too many pictures to be used to train the AI model (for example, thousands of pictures), the processor does not have enough memory and cannot directly use these pictures to train the AI model. In addition, if a high-resolution picture is divided into multiple (for example, one thousand) small pictures, the processor cannot automatically detect the ROI and select the required small pictures (for example, nine of them) according to the ROI to train the AI model, thus consuming a lot of storage space and training time. Additionally, if the high-resolution pictures are shrunk into pictures with a smaller file size, and these pictures with the smaller file size are used to train the AI model, abnormalities in the pictures will become less obvious due to the shrinkage. As a result, the training effect is poor.

As compared with the above practices, in some embodiments of the present disclosure, the processor 150 segments the picture FI7 according to the region RE4 representing the ROI, and performs mock object augmentation and image enhancement on the selected picture FI8 to generate image FI10. As a result, the memory space of the processor 150 and the training time can be significantly saved, and the training quality can be improved.

Figure 7B:
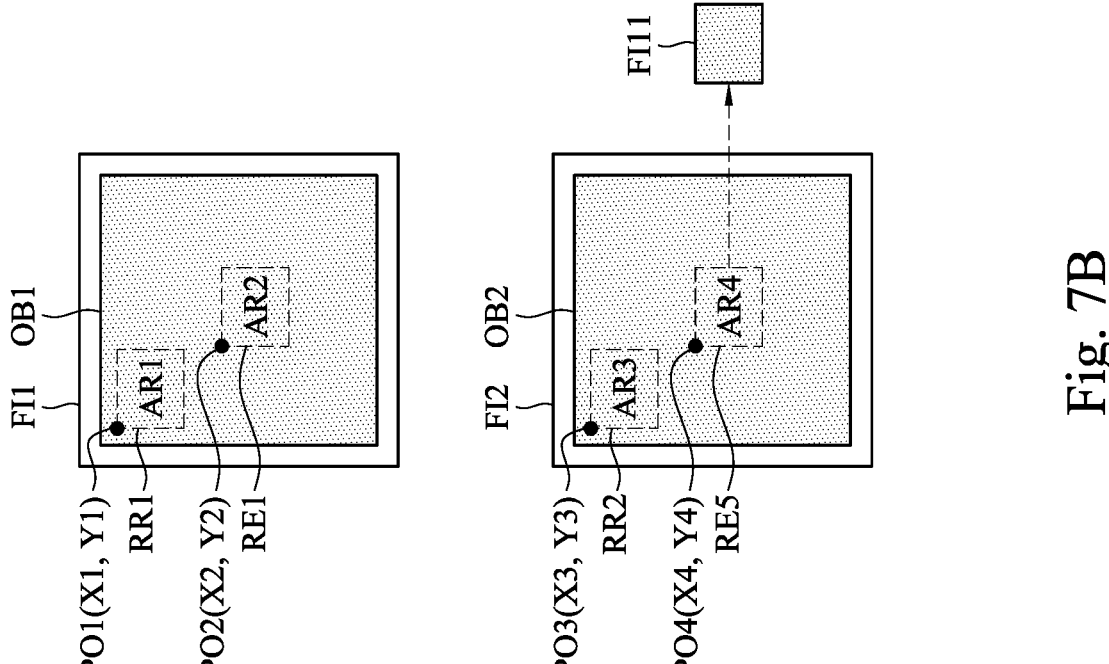
FIG. 7B depicts a schematic diagram corresponding to the operation shown in FIG. 7A according to some embodiments of the present disclosure.
Figure 7A:
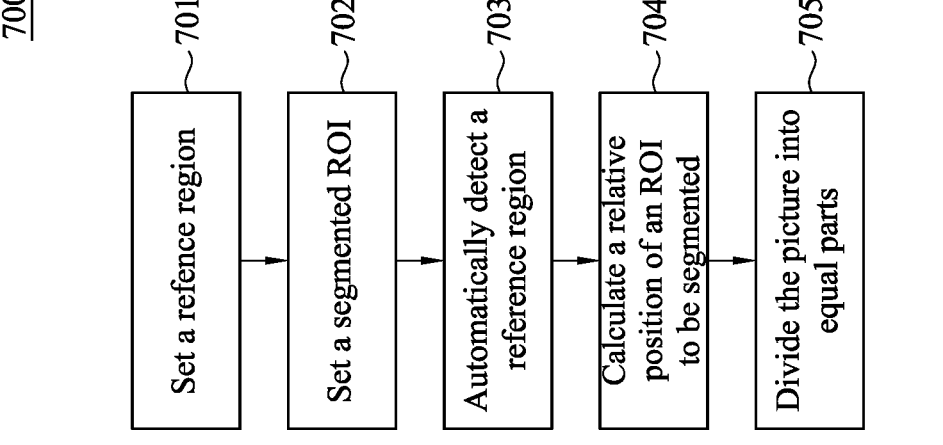

FIG. 7A depicts a flowchart of an operation 700 according to some embodiments of the present disclosure. In some embodiments, the operation 700 is applied to the detecting system 100 shown in FIG. 1, but the embodiment of the present disclosure is not limited thereto. In different embodiments, the operation 700 can be applied to some other detecting systems. For the purpose of illustration, relevant operations of the operation 700 will be described below by taking components of the detecting system 100 for example.

FIG. 7B depicts a schematic diagram corresponding to the operation 700 shown in FIG. 7A according to some embodiments of the present disclosure. A description is provided with reference to FIG. 7A and FIG. 7B. In some embodiments, the operation 700 can generate the picture FI11 based on the pictures FI1 and the picture FI2, but the embodiment of the present disclosure is not limited thereto. In different embodiments, the operation 700 may perform processing based on other pictures to detect and segment the ROI.

As shown in FIG. 7A, the operation 700 includes operations 701-705. In different embodiments, the operation according to the embodiment of the present disclosure includes one part or a combination of operations 701-705. A description is provided with reference to FIG. 3 and FIG. 7A. In some embodiments, the operation 700 corresponds to operation 301.

In operation 701, the processor 150 sets a reference region in the target object OB1 in the picture FI1, such as a region RR1. The region RR1 includes a coordinate point PO1 and has an area AR1, and the coordinate point PO1 has coordinate values X1 and Y1. In some embodiments, the region RR1 includes position parameters, such as multiple sets of position parameters constituted by X coordinates and Y coordinates. In some embodiments, a range framed by the region RR1 includes information of product type that can be identified, such as a specific shape, pattern, or print of the target object OB1. In some embodiments, the processor 150 calculates the area AR1 according to the range framed by the region RR1.

In operation 702, the processor 150 sets a segmented ROI in the target object OB1 in the picture FI1, such as the region RE1. The region RE1 includes a coordinate point PO2 and has an area AR2, and the coordinate point PO2 has coordinate values X2 and Y2. In some embodiments, the processor 150 calculates the area AR2 according to a range framed by the region RE1.

In operation 703, the processor 150 automatically detects a reference region of the target object OB2 in the picture FI2 according to the area RR1, such as a region RR2 similar to the region RR1. The regions RR2 includes a coordinate point PO3 and has an area AR3, and the coordinate point PO3 has coordinate values X3 and Y3. In some embodiments, the processor 150 calculates the area AR3 according to a range framed by the region RR2.

In operation 704, the processor 150 sets an ROI of the target object OB2 to be segmented in the picture FI2, such as a region RE5, according to a positional relationship between the regions RR1 and RE1. For example, the processor 150 calculates an area AR4 based on the fact that a ratio of the areas AR1 to the area AR3 is equal to a ratio of the area AR2 to the area AR4. In addition to that, the processor 150 calculates coordinate values X4 and Y4 of a coordinate point PO4 to set the region RE5 based on the fact that a ratio of the square root of the area AR1 to the square root of the area AR3 is the same as a ratio of a distance between the coordinate values X1 and X2 to a distance between the coordinate values X3 and X4, which is the same as a ratio of a distance between the coordinate values Y1 and Y2 to a distance between the coordinate values Y3 and Y4.

In operation 705, the processor 150 segments the picture FI2 according to the region RE5 to generate multiple pictures, and selects the picture FI11 including the region RE5 from the multiple pictures to perform processing. After operation 705, the processor 150 performs operation 302 to train the model 152, such as the model MD1, by using picture FI11.

In some practices, the processor sets the ROI, and then divides the picture into equal parts. Due to factors, such as different organizations or products, etc., the same product has different positions or sizes in different pictures. If the picture is divided into the equal parts directly, the segmented position and range will be inconsistent, thus resulting in poor training results.

As compared with the above practices, in some embodiments of the present disclosure, the processor 150 can automatically detect the regions RR2 and RE5 of the picture FI2 according to the preset regions RR1 and RE1 of the picture FI1, and generates the picture FI11 according to the region RE5 to train the model MD1. As a result, the ROI is more precisely segmented, and the training quality is improved.

In some embodiments, the operations similar to those performed on the target objects OB1-OB3 can be performed on the target objects OB4 and OB5. For example, the camera 130 captures the target objects OB4 and OB5 to generate images in the image 140 correspondingly. Operations similar to those performed on the pictures FI1-FI3 can be performed on the pictures FI4-FI11. For example, the processor 150 loads models in the model 152 correspondingly, such as the models MD1 and MD2, according to the pictures FI4-FI11, and sequentially trains the models by using the pictures FI4-FI11.

A description is provided with reference to FIG. 1, FIG. 5B, and FIG. 6B. In some embodiments, the target object OB4 corresponds to the information IN1 or IN2, and the target object OB5 corresponds to the information IN1 or IN2. The target objects OB4 and OB5 are implemented by the target object OB3. The picture FI7 is implemented by the picture FI3, FI4, or FI5. The picture FI4 is implemented by the picture FI3.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A detecting system comprising:
a camera configured to capture a first target object to generate a first image and capture a second target object different from the first target object to generate a second image; and
a processor configured to detect the first image by using a first model to generate a first result, train the first model by using the first result, segment a third image to generate a plurality of first segmented images, select a first segmented image from the plurality of first segmented images, extract a first template from the first image, generate a second template based on the first template, merge the second template and the first segmented image into a fourth image, enhance the second template in the fourth image to generate a fifth image, and train a second model by using the fifth image,
wherein when the processor trains the first model by using the first result, the camera captures the second target object, and
the processor further trains the first model by using the second image after the camera captures the second target object.

2. The detecting system of claim 1, wherein
the camera is further configured to capture a third target object to generate the third image, the processor is further configured to:
select the first model from a plurality of models according to first information of the first target object;
select the second model different from the first model from the plurality of models according to second information of the third target object, wherein the first information is different from the second information;
detect the third image by using the second model to generate a second result; and
train the second model by using the second result.

3. The detecting system of claim 1, wherein
the processor is further configured to set a third region and a fourth region in the second image correspondingly according to a positional relationship between a first region and a second region, segment the second image according to the fourth region to generate a plurality of second segmented images, select a second segmented image comprising the fourth region from the plurality of second segmented images, and train the first model by using the second segmented image.

4. A detecting method comprising:
capturing a first target object to generate a first image;
detecting the first image;
training a first model by using the first image;
capturing a second target object different from the first target object to generate a second image when training the first model by using the first image;
training the first model by using the second image after training the first model by using the first image;
segmenting a third image to generate a plurality of first segmented images;
selecting a first segmented image from the plurality of first segmented images;
extracting a first template from the first image;
generating a second template based on the first template;

merging the second template and the first segmented image into a fourth image; and
training a second model different from the first model by using the fourth image.

5. The detecting method of claim 4, further comprising:
capturing a third target object to generate the third image;
selecting the second model different from the first model according to the third image; and
training the second model by using the third image.

6. The detecting method of claim 4, further comprising:
setting a first region in the first image according to an abnormality of the first target object;
segmenting the second image according to the first region to generate a plurality of second segmented images;
selecting a second segmented image comprising a second region from the plurality of second segmented images; and
training the first model by using the second segmented image.

7. A method comprising:
generating a first image according to a first target object;
training a first model according to the first image and generating a second image according to a second target object different from the first target object simultaneously;
training the first model according to the second image after training the first model according to the first image;
segmenting a third image to generate a plurality of first segmented images;
selecting a first segmented image from the plurality of first segmented images;
extracting a first template from the first image;
generating a second template according to the first template;
merging the second template and the first segmented image into a fourth image; and
training a second model different from the first model according to the fourth image.

8. The method of claim 7, further comprising:
generating the third image according to a third target object;
selecting the second model different from the first model according to the third image; and
training the second model according to the third image.

9. The method of claim 8, wherein
the first target object has first information, and
the third target object has second information different from the first information.

10. The method of claim 7, further comprising:
generating a first region in the first image according to an abnormality of the first target object;
segmenting the second image according to the first region to generate a plurality of second segmented images;
selecting a second segmented image comprising a second region from the plurality of second segmented images; and
training the first model by using the second segmented image.

11. The method of claim 10, further comprising:
generating a third region in the first image;
generating a fourth region in the second image; and
generating the second region according to the first region, the third region and the fourth region, wherein
a pattern of the third region is similar to a pattern of the fourth region.

12. The method of claim 10, further comprising:

generating the third image according to a third target object;

selecting the second model different from the first model according to the third image; and training the second model according to the third image.

\* \* \* \* \*